Feb. 10, 1959   J. PRATURLON   2,872,887
ROTARY PRESS COMPRISING A PLURALITY OF TOOL GROUPS
Filed March 2, 1954   3 Sheets-Sheet 3
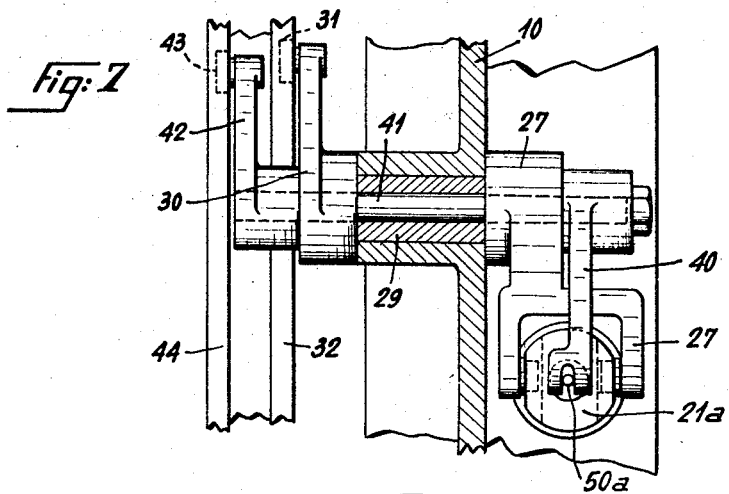
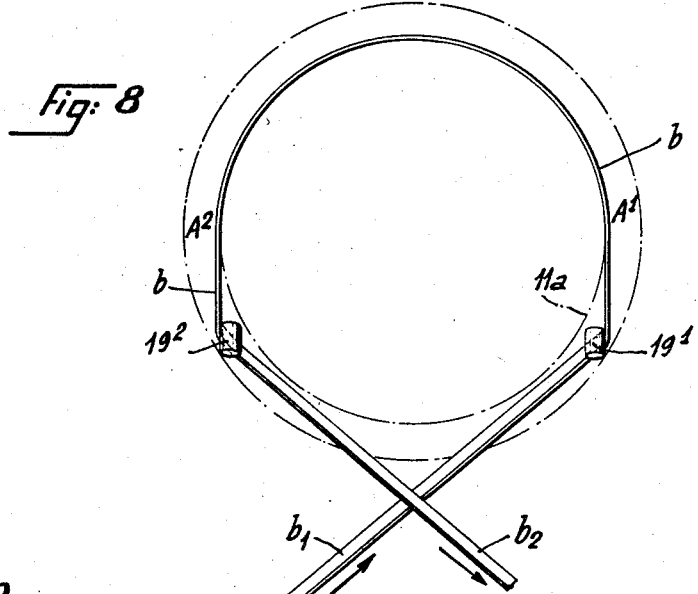
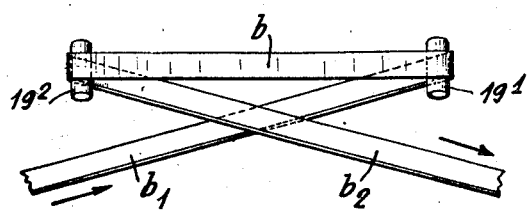
INVENTOR
JOSEPH PRATURLON United States Patent Office 2,872,887
Patented Feb. 10, 1959

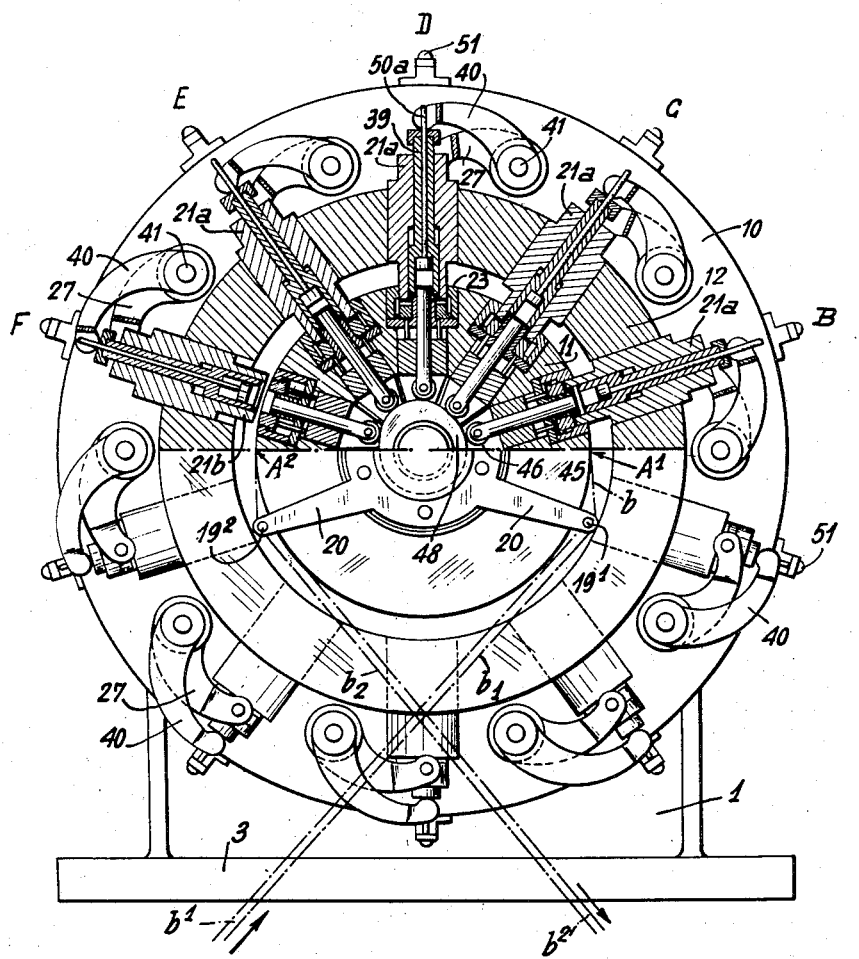

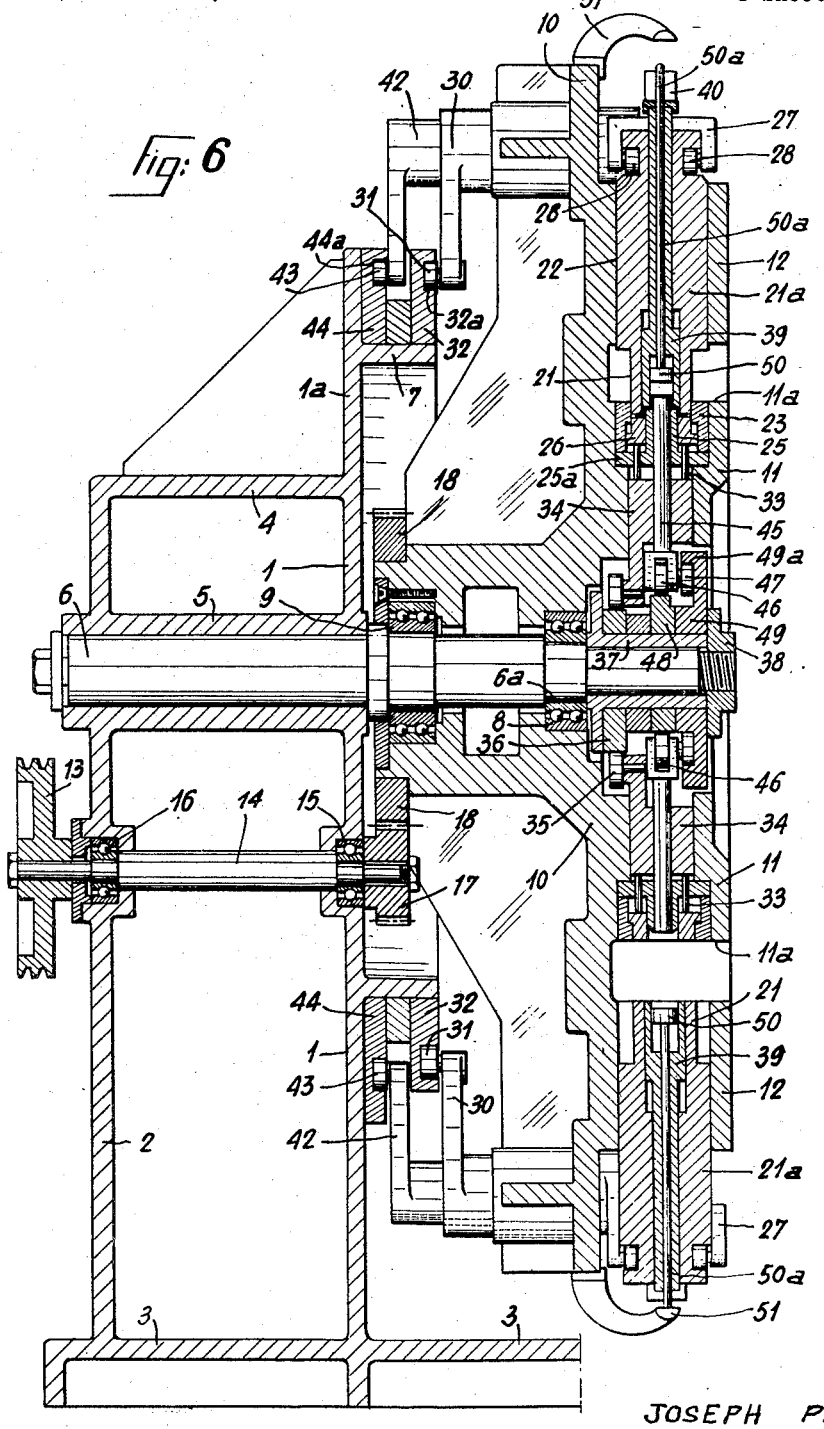

2,872,887

ROTARY PRESS COMPRISING A PLURALITY OF TOOL GROUPS

Joseph Praturlon, Asnieres, France

Application March 2, 1954, Serial No. 413,663

Claims priority, application France March 6, 1953

3 Claims. (Cl. 113—42)

The applicant has already disclosed in his prior Patent No. 2,619,177 a rotary press comprising several elementary presses or tool groups carried by a support which is driven by a central rotary shaft, said tool groups being adapted to work during the upper half of their course about the axis of said central shaft, and to recede during the lower half of said course, by a sliding movement on said support in the direction of said shaft, so as to avoid the incoming and outgoing portions of the metal band to be worked upon, which is drawn along by the beds of the elementary presses which are in working position and moves in a vertical plane.

Due to the fact that the tool groups recede during one half of their course and that the tools of each group are controlled exclusively by cams located outside the rotary support, the range of application of this machine is comparatively restricted.

The present invention has for its object a novel rotary press of the kind comprising several tool groups located radially on a rotary support and working during the upper half of their course of rotation, and wherein the feed of the metal band to be worked upon is effected by engagement of said band with the press bed, and this rotary press has been specially designed in order to be enabled to effect several stamping passes without the use of an intricate mechanism and to avoid in particular the backward movement of the tool groups during the lower half of their course.

To this effect, the press according to the invention is essentially characterized in that the rotary support comprises two concentric rims in each of which is mounted a part of each tool group, the bed of the press being formed at any time by the upper half of the outer surface of the inner rim, and guiding rollers being provided for leading the incoming and outgoing portions of the metal band obliquely with respect to the vertical plane of movement of said rim.

When each group of tools is designed for effecting several stamping passes, the movable tools carried by the outer rim are actuated by fixed cams which are mounted on the machine frame, while the movable tools carried by the inner rim are actuated by cams which are placed in the opening of said inner rim and mounted on the end of a stationary central shaft about which the rotary support rotates.

The appended drawings show by way of example an embodiment of the press according to the invention, in which each tool group is adapted to cut a blank and to effect two stamping passes thereon.

Fig. 1 is a front elevation of the press, the upper half being shown in section on a vertical plane passing through the axes of the tool groups carried by the rotary support.

Figs. 2, 3, 4 and 5 are axial sections of the work piece produced by the press, at different stages of its stamping.

Fig. 6 is a longitudinal vertical section of the press, at a larger scale than Fig. 1, the support of the guiding rollers for the metal band being removed.

Fig. 7 is a partial plan view, at a larger scale than Fig. 6, of the control means for a tool group carried by the outer rim.

Fig. 8 is an elevational view of the path followed by the metal band.

Fig. 9 is a corresponding plan view.

The machine has a frame which is for example box-shaped (see Fig. 6) and comprises two parallel vertical walls 1 and 2 cross-braced by a base plate 3, a transversal wall 4 and a tubular portion 5 in which is mounted the rear part of the stationary central shaft 6.

The vertical front wall 1 of the frame has an upward extension $1a$ and is provided with a cylindrical bearing ring 7 the purpose of which will be explained later and which is concentric with the shaft 6.

The rotary support 10 of the press is mounted by roller bearings 8 and 9 on the front part of the shaft 6 and presents on its front face two concentric annular projections 11 and 12 which constitute the aforesaid inner and outer rims of the support.

Rotation is imparted to the support 10 by means of a pulley 13 keyed on a shaft 14 which is rotatably mounted in bearings 15 and 16 carried by the walls 1 and 2 and bears a pinion 17 meshing with a toothed crown 18 fixed on the support 10.

The bed of the press is constituted at any time by the half of the outer surface $11a$ of the inner rim 11 located at the considered moment on the upper semicircle extending from $A^1$ to $A^2$ (Fig. 1). This bed is surrounded by the metal band $b$ from which the work pieces $p$ are being cut out. This band follows the path indicated by the arrows in Figs. 1, 8 and 9 and is applied with tension upon said bed, so as to be fed along by the rotation of the support 10. The incoming portion $b^1$ and the outgoing portion $b^2$ of the band $b$ are directed obliquely with respect to the vertical plane of the rim 11, so as to avoid the lower part of the support 10, by means of guiding rollers $19^1$ and $19^2$ the axes of which are mounted on a stationary support 20 (Fig. 1) and are conveniently inclined.

In the shown embodiment, the machine comprises for example ten tool groups equally distributed over the circumference of the rotary support 10, and each of said tool groups is adapted, for example, for cutting a blank and forming therein by two successive stamping passes two shoulders of different diameters, so as to obtain a work piece $p$ as shown on Fig. 5.

In order to cut the blank out of the metal band and to effect the first stamping pass which gives the piece successively the shape of Fig. 2 and that of Fig. 3, each tool group comprises a stamp 21 the shoulder $21a$ of which is movable in a radial bore 22 of the outer rim 12, and which cooperates with a fixed counter-stamp 23 mounted in a cavity of the inner rim 11. The stamp 21 plays at the same time the part of a die which cooperates with a fixed punch 25 located inside the counter-stamp 23, and with a blank-holder 26.

The combined stamp and die 21 is actuated by a lever 27 (Figs. 6 and 7) provided with rollers 28 which are engaged into recesses formed in the outer end of the stamp 21. Said lever 27 is keyed on a tubular shaft 29 the rotation of which is controlled by another lever 30 carrying a roller 31 guided in a groove $32a$ of convenient contour which is formed in a fixed cam 32 of annular shape centered on the aforesaid bearing ring 7 of the machine frame.

The blank-holder 26 is supported by rods 33 (preferably three) which pass through the base $25a$ of the punch 25 and rest upon a slide 34 carrying a roller 35 which rolls on a stationary cam 36 mounted no a ring 37 which surrounds the central shaft 6 near its front end and is pressed by a nut 38 against a shoulder $6a$ of said shaft.

When any one of the tool groups is in the position marked B on Fig. 1, the blank of the piece *p* has the shape shown on Fig. 2, and when said tool group reaches the position C of Fig. 1, the blank has received the shape shown on Fig. 3; the first stamping pass is thus finished and the second is about to begin.

For the second stamping pass, which gives the blank successively the shapes shown on Fig. 4 and Fig. 5, each tool group comprises, on the side of the outer rim 12, a movable die 39 which slides inside the stamping die 21 and is actuated by a lever 40 keyed on a shaft 41 passing through the tubular shaft 29. Rotation of the shaft 41 is controlled by another lever 42 which carries a roller 43 guided in a groove 44a of convenient contour formed in a cam 44 which is centered on the bearing ring 7 of the machine frame, like the aforesaid cam 32. On the side of the inner rim 11, the tool group comprises a punch 45 which is movable in a central bore formed in the aforesaid slide 34 and punch 25. The end of the punch 45 which projects into the central opening of the inner rim 11 is fork-shaped and carries two rollers 46 and 47. The roller 46 rolls on a stationary cam 48, while the roller 47 rolls against the rim 49a of another cam 49. The cams 48 and 49 are fitted on the aforesaid ring 37.

When any one of the tool groups is in the position marked D on Fig. 1, the blank of the piece *p* has the shape shown on Fig. 4, and when said tool group reaches the position E of Fig. 1, the last stamping pass is finished, the piece having received its final shape shown on Fig. 5.

The finished piece is ejected in the position F, where the die 39 recedes, by a piston 50 slidably mounted in said die 39 and having a piston rod 50a which abuts against an arm 51 mounted on the outer rim 12.

When the considered tool group passes below the horizontal median plane of the support 10, all its tools have resumed their position of rest.

It is to be understood that the invention is not limited to the embodiment which has been described and shown, but covers also any variations thereof. Thus, the number of tool groups may vary, as well as the size and shape of the tools themselves, in accordance with the size and shape of the piece to be stamped.

I claim:

1. Apparatus for punching and stamping articles from strip material, comprising a frame, a support journaled on a stationary shaft mounted on said frame and having radially spaced inner and outer rims of different diameters defining annular slot therebetween, said rims being located concentrically one within the other in the same plane perpendicular to the shaft, said inner rim having a circular periphery concentric with the axis of rotation of said support and forming an anvil, means for rotating said support, a plurality of cooperative pairs of unlike tool means disposed radially on said support and including radially movable tool elements cooperatively supported by both the inner and outer rims respectively, means for actuating said cooperative tool elements in predetermined cooperative relation in successive stages as said support is rotated, and guide means on said frame in fixed relation to said support and extending into said slot and having inclined surfaces for guiding strip material from one side of said support into and from said slot and in concentric engagement with a predetermined portion of the anvil forming periphery of said inner rim and between said cooperative tool elements, whereby said support may be continuously rotated with the strip material continuously fed over the operative anvil portion of said inner rim periphery and said tool means are successively operated to punch and press articles from the strip.

2. Apparatus for punching and stamping articles from strip material, comprising a frame, a support journaled on a shaft mounted on said frame and having concentrically spaced inner and outer rims of different diameters defining an annular slot therebetween, said inner rim having a circular periphery concentric with the rotational axis of said support and forming an anvil, means for rotating said support, said rims being located one within the other in the same plane perpendicular to the shaft, a plurality of cooperative pairs of unlike tool means disposed radially on said support and including radially movable tool elements cooperatively supported by said inner and outer rims respectively, means for actuating said cooperative tool elements in predetermined cooperative relation in successive stages as said support is rotated, said actuating means including cam means fixed on said frame and cam follower means operatively cooperative with said cam means and connected with each of said movable tool elements respectively, and guide means on said frame in fixed relation to said support for guiding strip material from one side of said support into and from said support slot and in concentric engagement with a predetermined portion of the anvil forming periphery of said inner rim and between said cooperative tool elements, said guide means including a pair of guide rollers extending into said slot and having axially inclined peripheries to lead the strip material between concentric relation with a portion of said anvil periphery and feeding and discharging paths oblique to the plane of rotation of said inner rim, whereby said support may be continuously rotated with the strip material continuously fed over the operative anvil portion of said inner rim periphery and said tool means are successively operated to punch and press articles from said strip.

3. Apparatus for punching and stamping articles from strip material, comprising a frame, a stationary shaft mounted on said frame, a support journaled on said shaft and having radially spaced inner and outer rims of different diameters defining an annular slot therebetween, said inner rim having a circular periphery concentric with said shaft and forming an anvil, means for rotating said support, said rims being located one within the other in the same plane perpendicular to the shaft, a plurality of cooperative pairs of unlike tool means disposed radially on said support and including radially movable tool elements cooperatively supported by said inner and outer rims respectively, means for actuating said cooperative tool elements in predetermined cooperative relation in successive stages as said support is rotated, said actuating means including cam means fixed on said frame and said shaft respectively and cam follower means operatively connected with each of said movable tool elements and respectively cooperative with said cam means, and guide means on said frame for guiding strip material from one side of said support into and from said support slot and in concentric engagement with a predetermined portion of the anvil forming periphery of said inner rim and between said cooperative tool elements, said guide means including a pair of inclined guide rollers in fixed position and extending into said slot to lead the strip material between concentric relation with a portion of said anvil periphery and feeding and discharging paths oblique to the plane of rotation of said inner rim, whereby said support may be continuously rotated with the strip material continuously fed over the operative anvil portion of said inner rim periphery and said tool means are successively operated to punch and press articles from said strip.

References Cited in the file of this patent

UNITED STATES PATENTS

| | | |
|---|---|---|
| 574,154 | Lane | Dec. 29, 1896 |
| 1,581,810 | Patrick | Apr. 20, 1926 |
| 1,766,214 | Booth | June 24, 1930 |
| 1,775,401 | MacMillan | Sept. 9, 1930 |
| 2,283,503 | Johnson | May 19, 1942 |
| 2,303,539 | Gibbs | Dec. 1, 1942 |
| 2,331,490 | Menkin | Oct. 12, 1943 |
| 2,537,026 | Brugger | Jan. 9, 1951 |

FOREIGN PATENTS

| | | |
|---|---|---|
| 339,254 | France | Feb. 7, 1905 |
| 1,034,628 | France | Apr. 15, 1953 |